United States Patent [19]

Hyatt

[11] 3,945,207
[45] Mar. 23, 1976

[54] HYDRAULIC PROPULSION SYSTEM
[76] Inventor: James Ervin Hyatt, 206 B Marlboro Road, Old Bridge, N.J. 08857
[22] Filed: July 5, 1974
[21] Appl. No.: 486,005

[52] U.S. Cl. .................. 60/416; 60/418; 60/419; 417/225; 417/286
[51] Int. Cl.² ..................... F15B 1/02; F15B 3/00
[58] Field of Search ............ 60/375, 384, 413, 416, 60/419, 428, 430, 486, 560, 574; 417/225, 286

[56] References Cited
UNITED STATES PATENTS

| 1,256,451 | 2/1918 | Ensign et al. | 60/563 |
| 2,330,739 | 9/1943 | Piron | 60/418 X |
| 2,597,050 | 5/1952 | Audemar | 60/536 |
| 2,616,265 | 11/1952 | Wilson | 60/546 |
| 2,876,704 | 3/1959 | Collion et al. | 60/419 X |
| 2,935,952 | 5/1960 | Rose | 60/419 X |
| 3,310,943 | 3/1967 | Horetzkg | 60/541 |

FOREIGN PATENTS OR APPLICATIONS

| 551,847 | 3/1943 | United Kingdom | 60/413 |

Primary Examiner—Edgar W. Geoghegan

[57] ABSTRACT

A hydraulic system for use in the propulsion of motor vehicles includes at least two volume multipliers each having a high pressure port, a low pressure port, and a piston in a chamber separating the high and low pressure ports. A prime mover and associated main hydraulic pump is arranged to alternately supply high pressure fluid to the high pressure ports of the multipliers, so as to produce a reciprocating motion in the pistons and create a continuous flow of high pressure fluid from a reservoir through the pump, into the high pressure port of one volume multiplier, out of the high pressure port of the other multiplier, and back to the reservoir. The reciprocating pistons are used to create a second, separate continuous flow of low pressure hydraulic fluid which circulates from the low pressure port of one volume multiplier through one or more hydraulic driving motors adapted to propel the vehicle, and back to the low pressure port of the remaining multiplier.

During deceleration of the vehicle, the prime mover may be turned off, whereupon the pistons no longer reciprocate. Low pressure fluid is directed through a path that includes the driving motors, now acting as pumps, and a brake motor mechanically coupled to a regenerative pump connected in the high pressure system. The latter is used to pump fluid from the reservoir into one or more accumulators disposed in the high pressure system, so as to store energy therein for later use.

10 Claims, 7 Drawing Figures

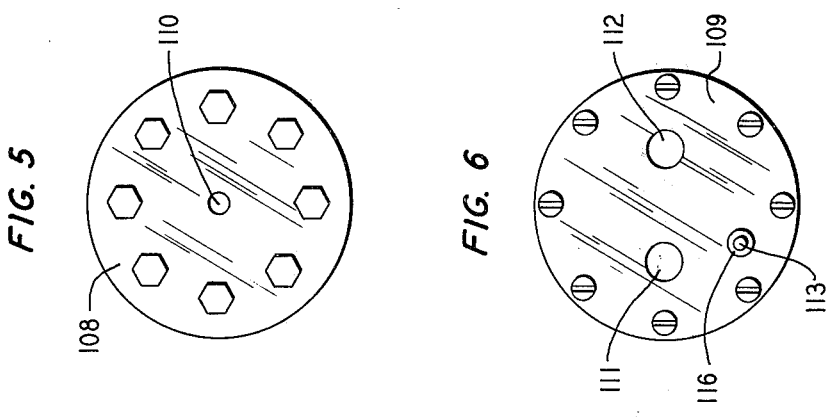
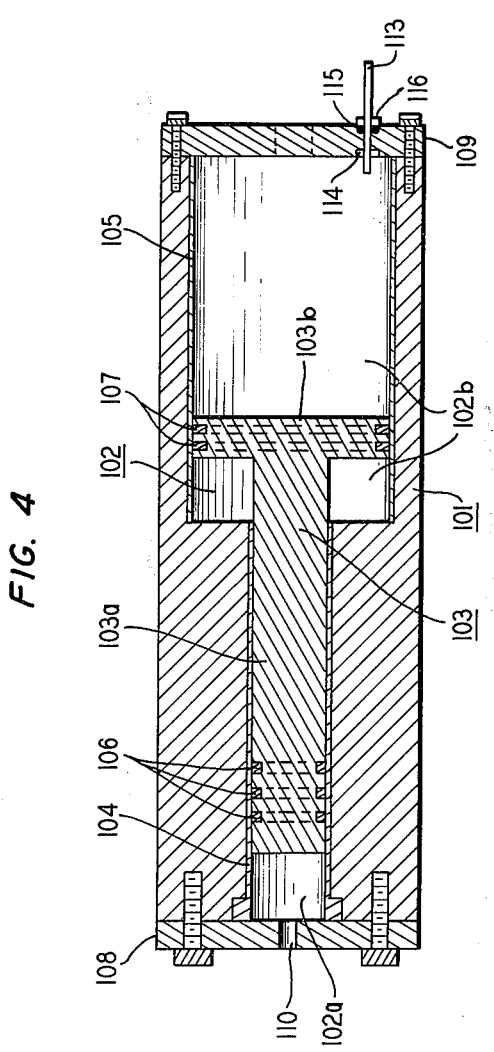

HYDRAULIC PROPULSION SYSTEM

BACKGROUND OF THE INVENTION

1. Field of the Invention

This invention relates generally to power transmission mechanisms, and, more particularly, to hydraulic systems for transmitting the power generated by a prime mover to the wheels of a motor vehicle, thereby propelling the same, or to a load driving motor, thereby moving the load.

2. Description of the Prior Art

While various hydraulic systems have been proposed for use in the transmission of motive power from a prime mover such as an internal combustion engine or a battery powered electric motor to the wheels of the vehicle being propelled, such systems have gained little, if any, commercial significance. A wide variety of factors undoubtedly account for this lack of acceptance, including, of course, the characteristic inertia of industry in adopting innovations that deviate markedly from a widely used product such as the mechanically driven automobile. However, numerous technical problems also hindered commerical exploitation of prior art hydraulic propulsion systems. For example, most systems were bulky and consequently heavy; the tanks needed to store large volumes of hydraulic fluid required in low pressure systems occupied vehicle space needed for other purposes. If high pressure was used instead, the volume of fluid flow needed to propel the vehicle at reasonable speeds (with reasonable accelerating power) was not available, without massive pump installations. In addition, although a great deal of attention was given in prior art systems to harnessing the energy normally lost during braking or down hill driving, the apparatus needed to effect energy conservation was often too expensive, complicated and cumbersome to justify the desired result.

In view of the foregoing, it is the broad object of the instant invention to provide a power transmission mechanism capable of propelling a motor vehicle or other load at reasonable speeds and with reasonable accelerating power without the problems normally associated with similar low or high pressure systems known in the prior art.

Other objects of the invention are to enable the transmission of motive power from a prime mover to the wheels or propellers of the vehicle without requiring apparatus of undue size or weight, to provide in such apparatus the capability of capturing and storing energy normally wasted, in an efficient manner, for later use in propulsion of the vehicle, and to generally improve the efficiency of the entire system by allowing the prime mover to shut down during time periods when power is not required.

SUMMARY OF THE INVENTION

Each of the foregoing and additional objects are achieved in accordance with the principles of the instant invention by a hydraulic vehicular propulsion system which includes two separate and distinct paths or circuits of fluid flow, one at a relatively high pressure, and the other at a relatively low pressure. More specifically, the system includes at least two volume multipliers each having a high pressure port, a low pressure port, and a piston in a chamber separating the ports, a reservoir of fluid for use in the high pressure system, and a prime mover and associated main hydraulic pump for alternately supplying the fluid from the reservoir to high pressure multiplier ports to set up a reciprocating motion in the pistons. The pistons, in turn, are used to pump a separate body of fluid at low pressure, circulating that fluid in a path from the low pressure port of one multiplier through one or more hydraulic driving motors adapted to propel the vehicle, back to the low pressure port of the remaining multiplier.

The system may advantageously further include at least one hydraulic accumulator disposed along the path of high pressure flow, capable of storing energy for later use. During deceleration of the vehicle, the prime mover may be rendered inoperative, whereupon the pistons cease to reciprocate. Simultaneously, low pressure fluid now driven by the hydraulic driving motors acting as pumps may be directed through a brake motor mechanically coupled to a regenerative pump connected in the high pressure system. This pump directs fluid from the reservoir into the accumulator, thereby storing energy therein.

By arranging the system as described above, many advantages are derived. For example, the low pressure system is ideally suited for vehicle propulsion at desired speeds, since a high volume flow may be developed; the high pressure system can be most efficiently driven by a high RPM prime mover such as a small internal combustion engine, and readily permits insertion of a hydraulic accumulator therein, since the accumulator volume required to store appreciable energy is reduced. Also, the provision of the accumulator allows the prime mover to shut down when a desired pressure is reached in the high pressure system, while still propelling the vehicle on stored energy. Accordingly, no relief valve or similar device wasteful of energy is needed in the high pressure system. Still further, the high pressure/low volume flow is efficiently converted to low pressure/high volume flow by at least two volume multipliers which, in accordance with the invention are simple and inexpensive to construct.

BRIEF DESCRIPTION OF THE DRAWING

Each of the foregoing and additional advantages of the present invention will be better understood by reference to the following detailed description, when read in light of the accompanying drawing in which:

FIG. 4 is a longitudinal cross-sectional view of a volume multiplier used in the system of FIG. 1;

FIGS. 5 and 6 are end views of the volume multiplier of FIG. 4; and

DETAILED DESCRIPTION

Figure 1:
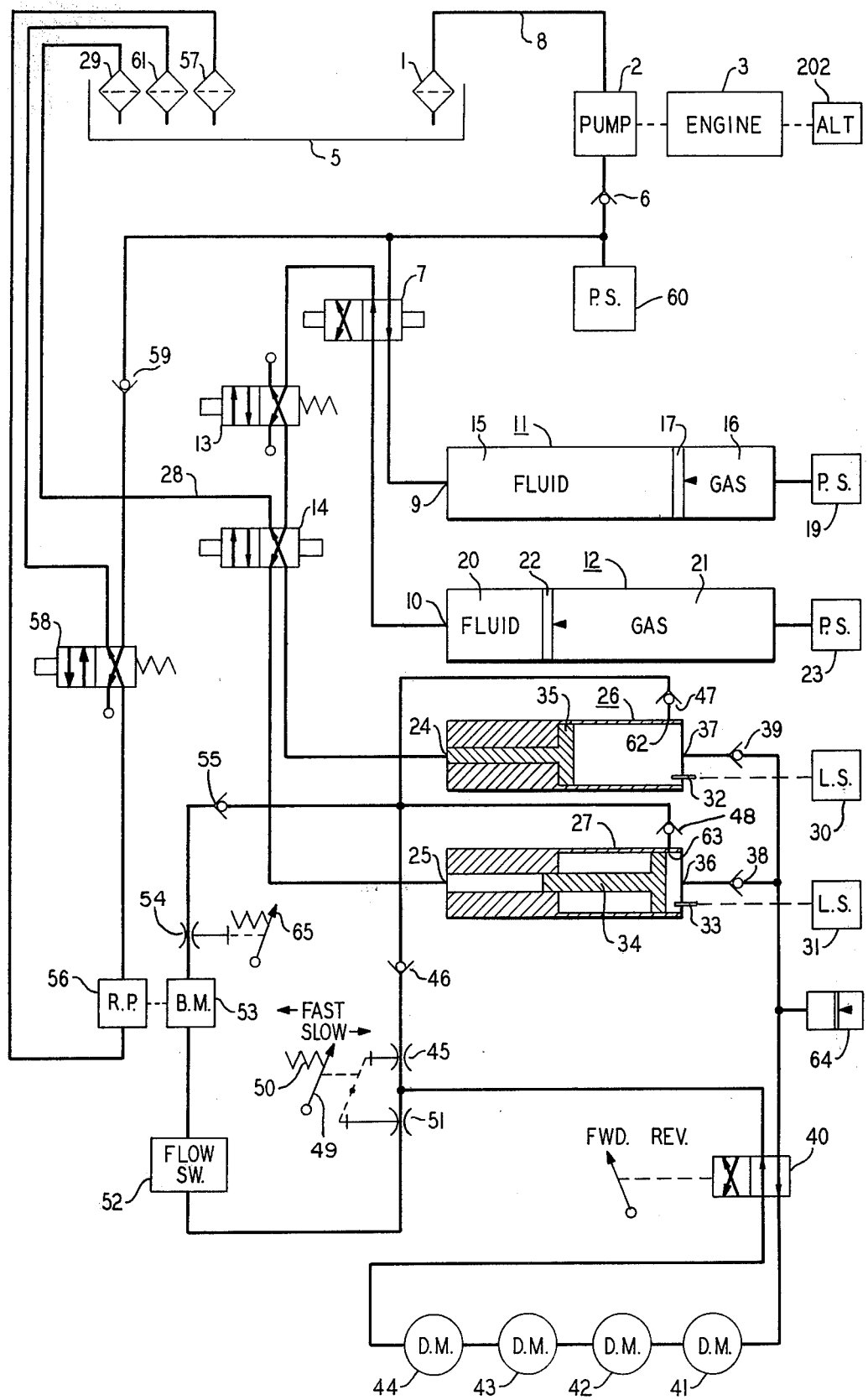
FIG. 1 is a schematic diagram of a hydraulic propulsion system constructed in accordance with the principles of the present invention.

Referring first to FIG. 1, there is shown a schematic diagram of a hydraulic propulsion system constructed in accordance with the principles of the instant invention. A pump 2, mechanically driven by an internal combustion engine 3, or any other suitable prime mover, is arranged to draw hydraulic fluid from a reservoir 5, and apply the fluid at high pressure to the primary side of a directional valve 7. A customary suction filter 1 may be located in the inlet line 8 near reservoir 5, and a check valve 6 may be located on the high pressure or output side of pump 2.

Fluid reaching valve 7, which is of conventional two position, two sided design, is directed into the input-/output port 9, 10 of one or the other of a pair of energy accumulators 11 and 12, respectively, depending upon the valve position. In the position shown in FIG. 1, high pressure fluid is directed into input/output port 9, and, as will be explained hereinafter, fluid is simultaneously dissipated or discharged from input/output port 10 through the opposite side of valve 7 and on through valve 13 to the primary side of directional valve 14 assuming valve 13 has moved to the right from the position shown in FIG. 1. When valve 7 is shifted, fluid reaching the valve is instead routed into input/output port 10 of accumulator 12, and fluid is simultaneously discharged from input/output port 9 through the opposite side of valve 7 and, as before, on through valve 13 to valve 14 assuming valve 13 has moved to the right from the position shown in FIG. 1.

Accumulator 11 is comprised of a housing which defines an inner cavity having a fluid chamber 15, a gas chamber 16, and a piston 17 separating the chambers. Piston 17 is arranged for longitudinal movement within the cavity which changes the relative volumes of the fluid and gas chambers, and also is provided with "O" rings or other seals (not shown) which prevent intermixing of the fluid and the gas. An inlet/outlet port 9 communicates with chamber 15. A pressure switch 19 is arranged to sense the pressure in gas chamber 16.

As high pressure fluid from pump 2 is applied to port 9 via valve 7, fluid enters chamber 15 and forces piston 17 to move from its initial position and compress the gas in chamber 16. When the pressure in that chamber reaches a predetermined level, pressure switch 19 shifts valve 7, and high pressure fluid is thus directed into chamber 20 of accumulator 12, moving piston 22 and compressing the gas in chamber 21 thereof. Simultaneously, the energy stored in the gas of accumulator 11 is used to move piston 17 back towards its initial position, discharging fluid from port 9 through valves 7 and 13 to valve 14. When piston 22 compresses the gas in chamber 21 sufficiently to reach the aforesaid predetermined pressure, switch 23 shifts valve 7 back to its original position, and the cycle is repeated. Accordingly, it is seen that the arrangement of pressure switches 19 and 23 and valve 7, which is responsive thereto, results in a reciprocating action in pistons 17 and 22 of accumulators 11 and 12 under the conditions specified above.

Valve 14, like valve 7, is of conventional two position, two sided design. By this it is meant that in one valve position, the two inlet ports or sides are connected directly to the two outlet ports or sides, so that, for example, the right side inlet and outlet are in communication, as are the left side inlet and outlet. In the second valve position, these connections are reversed, i.e., the right side inlet now communicates with the left side outlet, and the left side inlet with the right side outlet. Once the valve has taken a position, it maintains that position until shifted to its opposite position by actuation of an associated solenoid, not shown. Thus, depending upon the position of valve 14, high pressure fluid applied thereto is routed to the high pressure port 24, 25 of one of a pair of volume multipliers 26 and 27, respectively, which will be described in more detail hereinafter, and fluid discharged from the other multiplier high pressure port flows back through the opposite side of valve 14 to reservoir 5, via line 28 and filter 29. As shown in FIG. 1, but with valve 13 moved to the right from that depicted, flow is into high pressure port 25 of multiplier 27, and out of high pressure port 24 of multiplier 26, but of course this flow is reversed when the position of valve 14 changes.

To understand the arrangement by which the position of valve 14 is controlled, the construction of volume multipliers 26 and 27 must first be described. Referring to FIGS. 4–6, each volume multiplier includes a housing generally designated at 101 which defines inner cavity 102 having two generally cylindrical chambers 102a and 102b of different cross-sectional area. As shown, high pressure chamber 102a is of smaller cross-sectional area, and low pressure chamber 102b is of larger cross-sectional area. A longitudinally moveable piston designated generally at 103 is positioned within cavity 102, the piston comprising a cylindrical head section 103b adapted to fit within chamber 102b and an integral cylindrical tail section 103a adapted to fit within chamber 102a of cavity 102. Sections 103a and 103b are appropriately dimensioned in length so that piston 103 may travel freely to its end or limit position in either direction, at which time the working or active volumes of chambers 102a and 102b are maximum/minimum or vice-versa.

Housing 101 may be constructed from a cylinder of aluminum or other suitable material into which a first or smaller bore is made longitudinally from one end and a second or larger bore is made longitudinally from the other end, the chambers thus formed meeting near the central transverse plane of the cylinder. Accurately dimensioned steel sleeves 104, 105 may then be inserted in cavity chambers 102a and 102b, respectively, so that the inner surfaces of the chambers are of uniform diameter and resistant to wear. Piston 103 is placed within cavity 102, and a number of chevron type seals 106 or O rings 107 may be fitted around the circumference of tail section 103a and head section 103b, respectively, so that there is no leakage between the head and tail sections of the piston and the sleeves 104, 105. Assembly is completed by bolting or otherwise securing circular end plates 108 and 109 to the end faces of housing 101, and by forming an aperature or high pressure inlet/outlet port 110 in plate 108 which communicates with chamber 102a, and a pair of aperatures or low pressure ports 111 and 112, one an inlet and the other an outlet, in plate 109 which each communicate with chamber 102b.

A limit switch rod 113 is also inserted through plate 109, with appropriate seals 114 and 115 preventing leakage from chamber 102b. Rod 113 is spring biased by means (not shown) so shoulder 116 formed integral therewith is normally held in contact with the outer surface of end plate 109, and a portion of the rod protrudes into chamber 102b. When piston 103 reaches its rightmost point of travel, head section 103b of piston 103 engages and outwardly extends rod 113, which, as will be seen hereinafter, actuates a limit switch.

The function of the volume multiplier of FIG. 4 is to convert a high pressure/low volume flow directed into high pressure port 110 into a low pressure/high volume flow emanating or being discharged from low pressure outlet port 111. (Low pressure inlet port 112 is equipped with a check valve which prevents discharge flow therethrough, as will be described hereinafter). To more fully understand this operation, assume that piston 103 is at its leftmost point of travel, and that chamber 102b, having a maximum working volume at this position, is filled with low pressure hydraulic fluid at pressure, $p_l$. Assume further that the cross-sectional area of chamber 102a is $a_h$, that the cross-sectional area of chamber 102b is $$a_l = na_h, \tag{1}$$

where $n$ is a number greater than unity, and that a high pressure fluid at pressure $p_h$ is directed into high pressure port 110. Under these conditions, the force exerted by the high pressure fluid on tail section 103a of piston 103 is $p_h a_h$, which of course must equal the force exerted by head section 103b of piston 103 on the low pressure fluid. Accordingly, $$p_h a_h = p_l a_l \tag{2}$$

and, from Equation (1),
$$p_l = p_h \, a_h/a_l = p_h/n, \tag{3}$$

so that the pressure in chamber 102b is reduced from that in chamber 102a a factor of $1/n$. Similarly, when piston 103 is moved to the right a distance $d$ by the high pressure input applied thereto, a volume of fluid $$V_h = d \, a_h \tag{4}$$

enters chamber 102a. At the same time, the volume displaced by piston 103 in chamber 102b is given by $$V_l = d \, a_l. \tag{5}$$

Combining Equations (1), (4) and (5),
$$V_l/V_h = da_l/da_h = na_h/a_h = n, \tag{6}$$

so that the volume discharged at low pressure from outlet port 111 is $n$ times the volume applied at high pressure.

The pressure reduction and volume multiplication described above is only effected until piston 103 has moved to its rightmost point of travel; at this point, chamber 102a is at maximum working volume and is filled with high pressure fluid, and chamber 102b is at minimum working volume and is exhausted, or nearly so, of low pressure fluid. If, however, the high pressure flow to the volume multiplier of FIG. 4 is now shifted to the high pressure port of another volume multiplier, and that multiplier is in an initial condition wherein its piston is at its leftmost point of travel, the multiplier action will continue.

Returning now to FIG. 1, it will be recalled that by shifting the position of valve 14, high pressure flow is directed into the high pressure port of either multiplier 26 or multiplier 27. Valve 14 is controlled by limit switches 30 and 31, which are mechanically linked to limit switch rods 32 and 33, respectively, which are similar to rod 113 of FIG. 4. Specifically, when piston 34 of multiplier 27 reaches its rightmost point of travel, the piston actuates switch 31 via rod 33 in a manner so that valve 14 is shifted from the position shown in FIG. 1 to its other operating position. High pressure fluid is then directed into port 24 of multiplier 26, assuming valve 13 has moved to the right from the position shown in FIG. 1, causing piston 35 to travel toward and finally actuate limit switch 30 via rod 32, again reversing the position of valve 14 and repeating the abovedescribed cycle. Pistons 35 and 34 of multipliers 26 and 27 thus will reciprocate, one piston moving in the direction toward its limit switch rod under the force of the applied high pressure fluid and the other piston moving in the opposite direction, expelling high pressure fluid, provided that the aforesaid other piston is being urged by a flow of low pressure fluid entering the low pressure inlet port of the particular volume multiplier involved.

The reciprocating action occuring in pistons 35 and 34 sets up a flow of fluid at low pressure beginning in the low pressure chamber of the volume multiplier being driven by high pressure fluid, and ending at the low pressure chamber of the volume multiplier driving high pressure fluid back to reservoir 5. The path followed by this low pressure fluid in the apparatus of FIG. 1 is as follows: from the low pressure outlet port 36 (or 37) of the high pressure driven multiplier 27 (or 26), through check valve 38 (or 39), one side of reversing valve 40, one or more driving motors such as driving motors 41–44 shown connected in serial arrangement, the other side of valve 40, valve 45, check valve 46, check valve 47 (or 48), and back to the low pressure inlet port 62 (or 63) of the high pressure fluid driving multiplier 26 (or 27). When the position of valve 14 is shifted, low pressure flow is through the parts of the system indicated in parentheses above. If desired, a small accumulator 64 may be located in the low pressure system on the primary side of valve 40. This accumulator serves to maintain a constant pressure and fluid flow to the driving motors, as the directions of motion of pistons 34 and 35 change when valve 14 is actuated.

Driving motors 41–44, driven by the low pressure/high volume flow, are used to propel the vehicle or other load, either directly, or through suitable mechanical transmission or gear arrangements (not shown). If it is desired to reverse the direction of travel of the vehicle, valve 40 is shifted, thus directing low pressure flow through motors 44–41 (in that order), thereby reversing the direction of shaft rotation.

Figure 2:
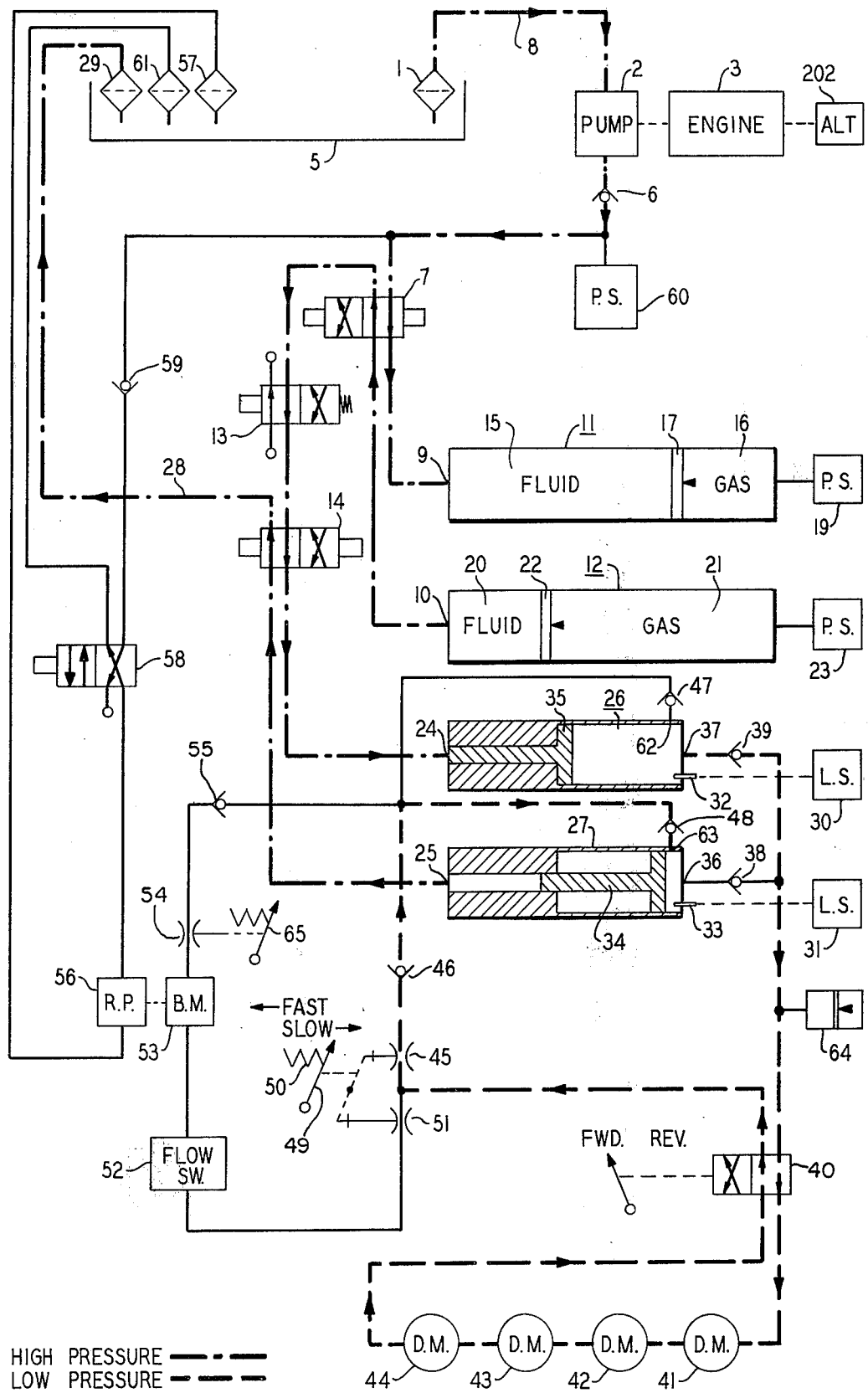
FIGS. 2 and 3 are similar to FIG. 1, but show the paths of high and low pressure fluid flow during vehicle acceleration and deceleration, respectively.

The aforedescribed mode of operation, which applies when the system is being used to accelerate the vehicle being propelled, can be readily summarized by reference to FIG. 2, which shows the paths of flow of high pressure and low pressure fluid under this condition.

In the high pressure system, fluid is drawn from reservoir 5 and applied under pressure from pump 2 via valve 7 to one accumulator, while the other accumulator is discharging fluid. Flow then proceeds back through valve 7, through valves 13 and 14, to the high pressure port of one volume multiplier. Simultaneously, the other multiplier is discharging fluid, which returns to reservoir 5 via valve 14 and filter 29, thus completing the high pressure circuit. As stated previously, the pistons in accumulators 11 and 12 are reciprocating, as are the pistons in multipliers 26 and 27.

In the low pressure system, a separate and distinct body of fluid is passed through a circuit which originates at the low pressure outlet of the multiplier being driven by the high pressure system and proceeds thence through valve 40, motors 41–44, back through valve 40, valve 45, check valve 46 to the low pressure inlet of the other multiplier. The low pressure/high volume flow through the motors propels the vehicle.

Returning once again to FIG. 1, the operation of the system will now be described when it is desired to decelerate or slow down the vehicle. In this event, the vehicle operator will first remove pressure applied to an accelerator linkage 49, allowing the linkage to return to a normal condition under the urging of a bias spring 50. With the linkage fully released, valve 45, previously open in response to linkage depression, is closed, and simultaneously, a valve 51 is opened. As a result, low pressure flow from motors 41–44 does not flow in the circuit toward check valve 46, but instead follows a path through flow switch 52, braking motor 53, valve 54, check valve 55 to the low pressure multiplier inlets. The fluid flow through switch 52 is sensed thereby, and as a result, valve 13 is moved to a closed position as shown in FIG. 1. Accordingly, high pressure fluid can no longer be applied to the high pressure ports of multipliers 26 and 27, and the reciprocating motion of pistons 35 and 34 consequently ceases. The multiplier low pressure chambers now simply act as reservoirs of low pressure fluid. Fluid flows in the circuit specified above under the propulsive force of motors 41–44 now acting as pumps which are mechanically driven by the vehicle wheels.

Figure 3:
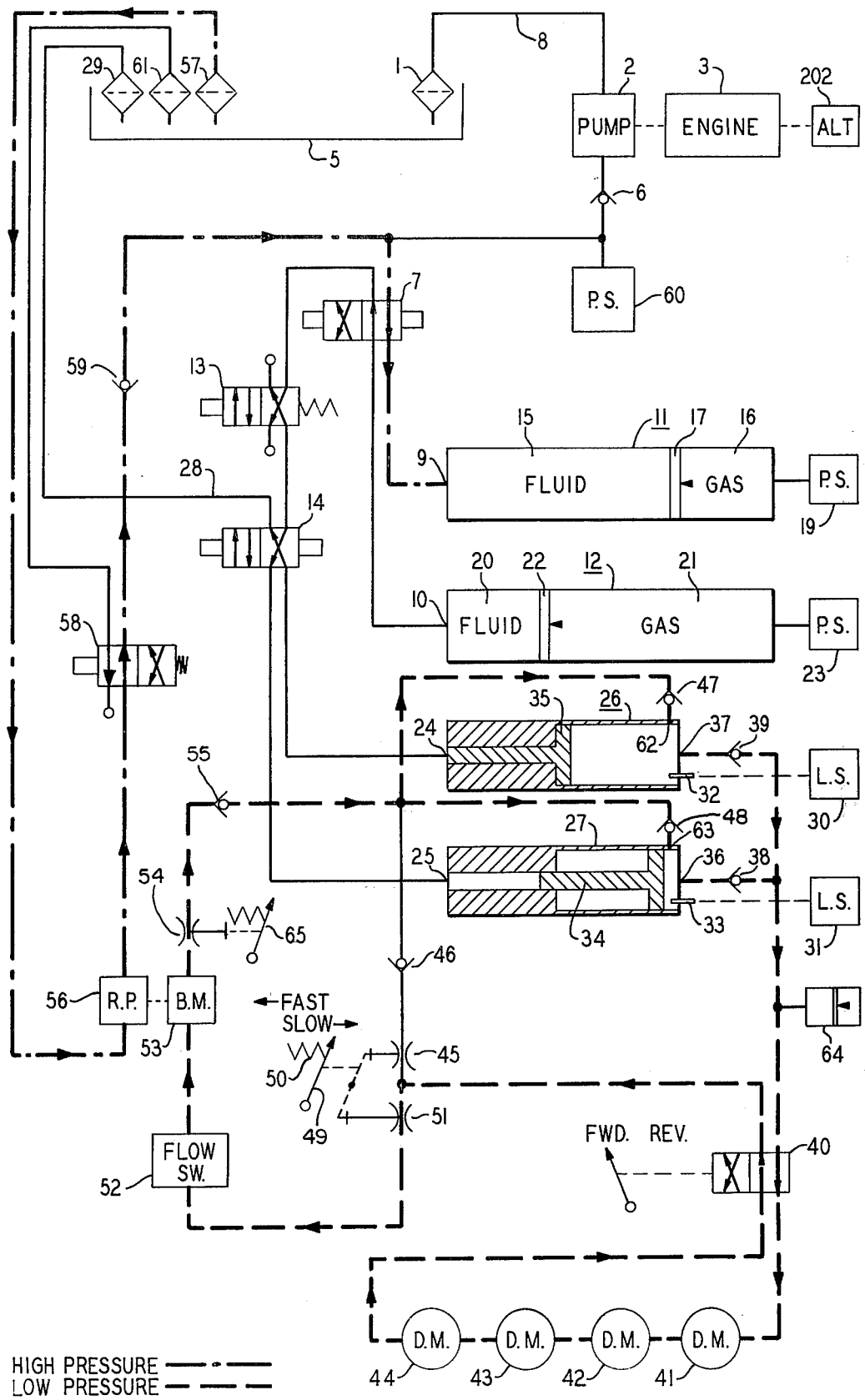

Braking motor 53 is mechanically linked to a regenerative pump 56 disposed in the high pressure system. Pump 56 draws fluid from reservoir 5 via filter 57, and as shown in FIG. 3 applies the fluid through valve 58 and check valve 59 to the primary side of valve 7. As stated previously, this valve directs fluid into the fluid chamber of either accumulator 11 or 12, depending upon which one is being charged. Assuming that accumulator 11 is the first to be fully charged, pressure switch 19 will sense this condition, and reposition valve 7 so as to shift the high pressure flow to accumulator 12. As that accumulator begins to charge, accumulator 11 cannot discharge, because valve 13 is closed. Accordingly, when accumulator 12 also becomes fully charged, fluid flow toward the primary side of valve 7 will build up the pressure thereat. This pressure buildup is sensed by a pressure switch 60 disposed in the line between pump 2 and valve 7. Switch 60 is arranged to shut down engine 3, which is not then needed, in order to conserve fuel. When both accumulators are fully charged, vehicle deceleration becomes very rapid. If the operator so desires, accelerator linkage 49 can now be depressed, in order to maintain a gradual stopping action. On the other hand, if it should be desired to decelerate or brake the vehicle even more quickly, valve 54 may be closed by depression of a brake linkage 65. This blocks fluid flow from motors 41–44, and stops the vehicle.

The paths followed by low and high pressure fluid during vehicle deceleration can be readily summarized by reference to FIG. 3.

In the low pressure system, fluid is drawn from the low pressure chambers of multipliers 26 and 27 by motors 41–44 acting as pumps. Flow from the low pressure chambers is through check valves 38, 39, valve 40, motors 41–44, valve 40, valve 51, flow switch 52, brake motor 53, valve 54, check valve 55 and back to the low pressure chambers via check valves 47 and 48. In this mode of operation, valve 13 has been closed as shown in FIG. 3, and pistons 34 and 35 are stationary. If a full vehicle stop is desired, valve 54 is closed.

In the high pressure system, fluid is drawn by regenerative pump 56 (driven by motor 53) from reservoir 5 and applied through valves 58 and 7 to the fluid chambers of accumulators 11 and 12, until both are fully charged. At this time, back pressure on brake motor 53 will stop its rotation. In addition, valve 58 is then shifted under the control of flow switch 52 which detects the stoppage of fluid flow therethrough, so that pump 56 now draws fluid from reservoir 5 and returns it directly thereto, if brake motor 53 should continue to rotate.

When it is again desired to increase the speed of the system shown in FIG. 1, accelerator linkage 49 is again depressed, thereby opening valve 45 and closing valve 51. The flow through switch 52 is thus cut off, and valve 13 is therefore reopened to the position shown in FIG. 2. Energy stored in the accumulators 11, 12 can now be used to drive multipliers 26, 27 in the manner specified previously. The pressure sensed by switch 60, which drops as the stored accumulator energy is expended, will again cause engine 3 to turn on to provide prime motive power.

Although the foregoing description is directed to system operation during acceleration (valve 45 open, valve 51 closed) and deceleration (valve 45 closed, valve 51 open), it is to be clearly understood that operation between these extremes is also possible. With partial depression of linkage 49, valves 45, 51 are each partially open, in which case a steady vehicle speed may be obtained. Of course, as the balance between valves 45 and 51 is changed, acceleration or deceleration result. Thus, linkage 49 operates in much the same way as an accelerator pedal on a conventional automobile. In addition, as described above, brake linkage 65 operates in a manner similar to that of a conventional brake pedal.

Figure 7:
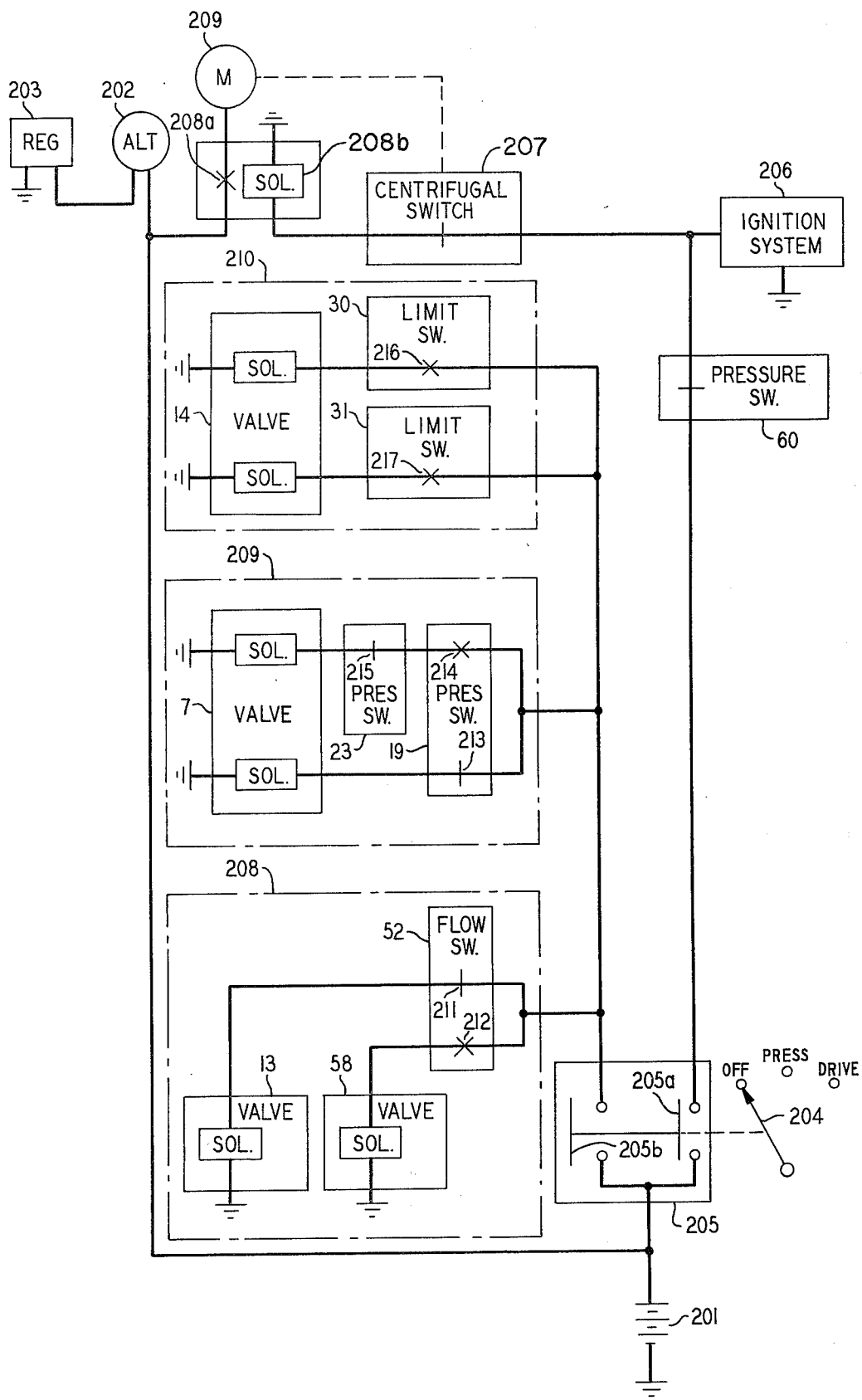
FIG. 7 is a wiring diagram of the electrical system used in the operation of the apparatus of FIG. 1.

Referring now to FIG. 7 there is shown a wiring diagram of the electrical system used in the operation of the apparatus of FIG. 1. The system uses a storage battery 201 as a power source, the positive battery terminal being connected to an alternator 202 mechanically coupled either to engine 3 of FIG. 1 or to the vehicle wheels through a suitable belt or other driving arrangement (not shown). The negative battery terminal is connected to a chassis ground. A conventional voltage regulator 203 maintains the alternator output at a proper voltage level to insure battery charging.

When a key switch lever 204 is moved from its OFF position to a "pressure position," an electrical path is completed from the positive battery terminal through contacts 205a of switch 205 and the normally closed contacts of pressure switch 60 to (1) to a conventional ignition system 206, and (2) through the contacts of a centrifugal switch 207 to the coil of solenoid 208b. The solenoid contacts 208a thus close, energizing a starting motor 209. When engine 3 is started, the contacts of centrifugal switch 207 open, and the motor 209 is deenergized. Should pressure switch 60 sense a pressure buildup in the high pressure system, its contacts will open, and the ignition system will become disabled, shutting off engine 3.

In the pressure position, pump 2 supplies high pressure fluid to accumulators 11 and 12, fully charging them. Pressure switch 60 thereafter shuts off engine 3.

When switch lever 204 is moved further to its drive position, contacts 205b of switch 205 also close, applying positive battery potential to three subcircutis 208, 209 and 210.

In subcircuit 208, current flows through normally closed contact 211 of flow switch 52, thereby opening valve 13 and allowing fluid to enter the high pressure multiplier ports. If flow switch 52 is energized, as by vehicle deceleration, contacts 211 open to reposition valve 13 to a closed condition. Simultaneously, contacts 212 close, permitting a current flow therethrough which actuates valve 58 so that fluid expelled from regenerative pump 56 may reach accumulators 11 and 12.

In subcircuit 209, current flows through normally closed contacts 213 of pressure switch 19, thereby positioning valve 7 to allow high pressure flow into the fluid port of accumulator 11. When that accumulator becomes fully charged, contacts 213 open and contacts 214, also controlled by switch 19, are closed. Current flows through contacts 214 and normally closed contacts 215 associated with pressure switch 23, shifting the position of valve 7 and allowing accumulator 12 to become charged. When that accumulator is fully charged, contacts 215 and 214 open, contacts 213 close, and the cycle is repeated.

In subcircuit 210, current can be applied to change the position of valve 14 in two ways: through contacts 216 associated with limit switch 30 or contacts 217 associated with limit switch 31. If limit switch 30 associated with multiplier 26 is actuated, valve 14 is positioned to direct high pressure flow into multiplier 27; if limit switch 31 associated with multiplier 27 is actuated, valve 14 is repositioned to direct flow into multiplier 26.

In the drive position, the system operates as described in detail above.

Having thus described the construction and arrangement of the hydraulic propulsion system in accordance with the present invention, its many features and advantages should be readily apparent to those skilled in the art. In general terms, the system is capable of propelling a 4000 pound vehicle at maximum speeds of approximately 70 mph, while requiring a prime mover such as an internal combustion engine capable of developing only 8–15 h.p. Accordingly, an order of magnitude improvement in fuel economy is possible. Energy ordinarily wasted during deceleration is captured in the accumulators for later use, also adding to efficiency. This increased efficiency will have direct antipolution benefits, due to the small engine size and the stability of the system to operate on stored energy.

The use of separate and distinct high and low pressure systems which interact only in the volume multipliers, where high pressure/low volume flow is converted to low pressure/high volume flow, also possesses several important advantages: First, the accumulators may be disposed in the high pressure system, so that a significant amount of energy can be stored in a small volume. Second, the driving motors are located in the low pressure system, and can operate efficiently on the high volume flow. Third, the engine may operate at high speed, where its efficiency is highest, since the pump driven thereby is advantageously of high speed, low displacement design. Fourth, the engine can be shut down when sufficient pressure builds up in the high pressure system; no energy wasteful relief valve is required.

Many modifications and adaptations of the instant invention will be readily apparent to those skilled in the art. Accordingly, it is intended that the invention be limited only by the appended claims. For example, in addition to its use in automobiles, the invention can be practiced in almost any wheeled vehicle, and in other applications where large internal combustion engines are now employed to put weight in motion. Also, various system details may be varied: the accumulators may employ an extensible diaphragm in lieu of a floating piston; indeed, no separation is required if the liquid and gas used in the accumulators are immiscible. Different valve and control arrangements than those shown may prove equally satisfactory. Finally, the fluid utilized, if a gas, would necessitate minor modifications well known to persons skilled in the art.

I claim:

1. An energy transmission system comprising
   a. a motive power
   b. a reservoir containing a first body of fluid,
   c. first and second volume multipliers each having a high pressure chamber, a low pressure chamber and a piston separating said chambers, said pistons of said first and second multipliers arranged for movement independent of each other,
   d. a valve having first and second positions,
   e. a pump driven by said prime mover arranged to supply fluid from said reservoir through a pump output to said valve,
   f. means for directing said fluid to said high pressure chamber of said first multiplier when said valve is in said first position,
   g. means for directing said fluid to said high pressure chamber of said second multiplier when said valve is in said second position,
   h. means for controlling said position of said valve whereby said pistons are driven in a reciprocating motion,
   i. a second body of fluid driven by said pistons and emanating from said low pressure chambers, and
   j. means including at least one motor for receiving said second body of fluid.

2. The invention defined in claim 1 further including a second valve having first and second positions,
   first and second accumulators for storing under pressure excess fluid generated by said pump, said accumulators each comprising a housing defining an internal chamber, an inlet/outlet port permitting communication between said chamber of one of said accumulators and said pump output, depending upon the position of said second valve, and a variable volume of gas in said chamber, and
   means for controlling the position of said second valve to direct said excess fluid to the one of said first and second accumulators having less excess fluid stored therein, and to direct said excess fluid stored in the other one of said accumulators toward said multipliers.

3. The invention defined in claim 2 further including a moveable piston in said chamber of said accumulators for separating said fluid from said gas.

4. An energy transmission system comprising
   first means including a pump driven by a prime mover for establishing a first circuit of high pressure/low volume fluid flow,
   second means responsive to said flow of high pressure/low volume fluid for establishing a second circuit of low pressure/high volume fluid flow, and
   at least one fluid motor disposed in said second circuit for receiving energy generated by said prime mover,
   wherein said second means includes first and second volume multipliers each having a high pressure chamber, a low pressure chamber and a piston separating said chambers,
   said pistons of said first and second multipliers are arranged for movement independent of each other,
   said high pressure chambers are connected to third means disposed in said first circuit, said third means are arranged to receive said flow of high pressure/low volume fluid and to alternately direct said high pressure/low volume flow into said high pressure chambers of said first and second volume multipliers, whereby said pistons of said first and second multipliers reciprocate, and said low pressure chambers are connected in said second circuit to discharge said flow of low pressure/high volume fluid driven by said pistons.

5. The invention defined in claim 4 further including fourth means disposed in said first circuit for storing excess fluid generated by said pump.

6. A vehicular propulsion system comprising
a reservoir of fluid,
first means including a pump for generating a high pressure/low volume flow of said fluid,
a second body of fluid,
second means driven by said high pressure/low volume flow of said fluid for driving said second body of fluid at low pressure/high volume, and
third means including at last one motor for receiving said low pressure/high volume fluid and for propelling said vehicle,
wherein said second means includes first and second volume multipliers each defining an internal cavity having a high pressure chamber for receiving said high pressure/low volume fluid, a low pressure chamber for discharging said low pressure/high volume fluid, and a piston communicating with and separating said chambers,
said pistons of said first and second multipliers arranged for movement independent of each other,
said system further including
a valve having first and second positions,
means for directing said fluid to said high pressure chamber of said first multiplier when said valve is in said first position,
means for directing said fluid to said high pressure chamber of said second multiplier when said valve is in said second position, and
means for controlling said position of said valve whereby said pistons are driven in a reciprocating motion.

7. Apparatus for converting a first fluid flow at pressure $p_i$ to a second fluid flow at pressure $np_i$ comprising first and second volume multipliers each including
a housing defining an internal cavity,
a piston in said cavity separating said cavity into first and second chambers,
said piston having first and second active areas communicating with said first and second chambers, respectively, the ratio of said first and second areas being 1:n,
said pistons of said first and second multipliers arranged for movement independent of each other,
means for alternately applying said first fluid flow to said first chambers of said multipliers whereby said pistons are driven in a reciprocating motion,
means for receiving said second fluid flow driven by said pistons from said second chambers of said multipliers,
a first reservoir of fluid for continuously supplying fluid to and receiving fluid from said first chambers, and
a second reservoir of fluid for continuously supplying fluid to and receiving fluid from said second chambers,
wherein said first and second fluid flows are separate and distinct.

8. The invention defined in claim 1 wherein
each of said pistons of said first and second multipliers has a position at which its travel is limited, said limit position being indicated by a maximum volume in said high pressure chamber and a minimum volume in said low pressure chamber, and
said controlling means includes means for sensing the attainment of said limit position by one of said pistons of one of said multipliers, and means responsive to said sensing means for directing said fluid to the other of said multipliers.

9. The invention defined in claim 5 further including
a braking motor
fifth means for diverting a portion of said low pressure/high volume flow in said second circuit to drive said braking motor,
a regenerative pump by said braking motor arranged to generate a second circuit of high pressure/low volume fluid flow, and
sixth means for directing said second high pressure/low volume flow to said fourth means.

10. The invention defined in claim 9 further including seventh means disposed in said second high pressure/low volume circuit and adapted to restrict the fluid flow therein, whereby the energy received by said at least one fluid motor is controlled.

* * * * *